US012789549B2

(12) United States Patent
Estrada

(10) Patent No.: US 12,789,549 B2
(45) Date of Patent: Nov. 10, 2026

(54) WHEEL COMPONENT WITH AERODYNAMIC AND COOLING EFFICIENCY

(71) Applicant: Mercedes-Benz Group AG, Stuttgart (DE)

(72) Inventor: Gustavo Estrada, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 443 days.

(21) Appl. No.: 18/262,860

(22) PCT Filed: Dec. 3, 2021

(86) PCT No.: PCT/EP2021/084103
§ 371 (c)(1),
(2) Date: Jul. 25, 2023

(87) PCT Pub. No.: WO2022/161667
PCT Pub. Date: Aug. 4, 2022

(65) Prior Publication Data

US 2024/0109367 A1 Apr. 4, 2024

(30) Foreign Application Priority Data

Jan. 26, 2021 (DE) ..................... 10 2021 000 358.6

(51) Int. Cl.
*B60B 19/10* (2006.01)

(52) U.S. Cl.
CPC ........ *B60B 19/10* (2013.01); *B60B 2900/513* (2013.01)

(58) Field of Classification Search
CPC ...................................................... B60B 19/10
(Continued)

(56) References Cited

U.S. PATENT DOCUMENTS 4,593,953 A * 6/1986 Baba ..................... B60B 7/0086 301/6.3
8,382,209 B2 * 2/2013 Yin ........................... B60B 7/20 301/6.3

(Continued)

FOREIGN PATENT DOCUMENTS

CN 106143117 A 11/2016
CN 110370861 A 10/2019

(Continued)

OTHER PUBLICATIONS

PCT/EP2021/084103, International Search Report dated May 11, 2022 (Two (2) pages).

(Continued)

*Primary Examiner* — Jason R Bellinger
(74) *Attorney, Agent, or Firm* — Crowell & Moring LLP

(57) ABSTRACT

A wheel component for a motor vehicle includes a rim base, a wheel hub, a rim disc, and an aero ring. The aero ring rests on the rim base in a circumferential direction and forms a circular ring starting from the rim base radially in a direction of the wheel hub. The rim disc is displaceable in a direction of an axis of rotation of the wheel component relative to the wheel hub between an open state and a closed state. The rim disc rests with an outer end face against an inner front surface of the aero ring in a sealing manner in the closed state of the rim disc. There is larger flow cross-section through the wheel component with the rim disc in the open state than in the closed state.

8 Claims, 2 Drawing Sheets

(58) Field of Classification Search
USPC .................................................... 301/6.3, 6.4
See application file for complete search history.

(56) References Cited

U.S. PATENT DOCUMENTS

| | | | | |
|---|---|---|---|---|
| 9,469,155 | B2 | 10/2016 | Platto et al. | |
| 11,077,707 | B2 | 8/2021 | Wong et al. | |
| 11,504,997 | B2 * | 11/2022 | Biancalana | B60B 3/10 |
| 11,618,279 | B2 | 4/2023 | Tsiberidis | |
| 11,820,167 | B2 * | 11/2023 | Kawamura | B60B 3/10 |
| 2017/0043616 | A1 | 2/2017 | Wippler | |

FOREIGN PATENT DOCUMENTS

| | | | |
|---|---|---|---|
| CN | 111801229 | A | 10/2020 |
| DE | 38 16 415 | A1 | 11/1989 |
| DE | 10 2011 016 535 | B3 | 5/2012 |
| DE | 10 2013 114 476 | A1 | 6/2014 |
| DE | 10 2015 015 721 | A1 | 3/2017 |
| DE | 10 2016 013 286 | A1 | 5/2017 |
| DE | 10 2017 009 746 | A1 | 4/2019 |
| DE | 10 2018 200 828 | A1 | 7/2019 |
| EP | 0 172 792 | A2 | 2/1986 |
| EP | 1 319 526 | A2 | 6/2003 |
| EP | 2 508 361 | A1 | 10/2012 |

OTHER PUBLICATIONS

German-language German Office Action issued in German application No. 10 2021 000 358.6 dated Apr. 12, 2022 (Six (6) pages).
"ABS Sportsline: Startschuss fuer das Tuning-programm zum aktuellen Audi Q7—330—Diesel-PS", Speed Magazine, Apr. 4, 2019, German-language, 3 pp.
German-language German Office Action issued in German Application No. 10 2021 000 358.6 dated Mar. 20, 2024 (5 pages).
Chinese-language Office Action issued in Chinese Application No. 202180091768.2 dated Jul. 30, 2025 (10 pages).

* cited by examiner

WHEEL COMPONENT WITH AERODYNAMIC AND COOLING EFFICIENCY

BACKGROUND AND SUMMARY OF THE INVENTION

The invention relates to a wheel component for a motor vehicle and a method for operating such a wheel component.

A vehicle wheel comprising a rim, a brake pot fixed to the rim and a brake disc fixed to the brake pot proceeds from EP 2 508 361 A1, wherein several pivotably mounted platform-shaped covering elements for temporarily closing assigned openings in the rim are provided on the rim. Every covering element is displaced from an open position into a closed position by centrifugal force. A disadvantage of this vehicle wheel is that the covering elements are exclusively displaced by the centrifugal force, and thus cannot be displaced into an individual position.

DE 10 2013 114 476 A1 discloses a vehicle that is provided with a hub and a rim. The hub extends inwards from a wheel in the longitudinal direction. The rim is installed over the hub and designed for movement relative to the hub. The vehicle additionally comprises a panel arrangement that has a carrier and a first and a second panel. The carrier extends radially outwards from the rim and the first and the second panel are respectively pivotably connected to the opposite side edges of the carrier. The panels pivot between an extended position and a retracted position and move radially translationally to optionally close a wheel opening. A disadvantage of this panel arrangement is that the panels can only be displaced either into the extended position or into the retracted position.

DE 10 2015 015 721 A1 discloses a wheel, in particular a rim for a vehicle, having a plurality of spokes, slats, fenders, wheel segments or the like arranged on an outside of the wheel, and having kinematics by means of which the contour of the outside of the wheel can be changed. A hub can further be displaced between an internal position and an external position. A disadvantage of this wheel is that a ventilation surface remains constant. The wheel segments thus are not suitable for brake cooling.

A vehicle wheel comprising a rim connected to the wheel flange via spokes further proceeds from DE 10 2016 013 286 A1. A plurality of moveable flaps is provided on the vehicle wheel, which can be moved into a position covering the outside of the spokes and into a position releasing the spokes depending on a vehicle speed, wherein the flaps can be folded or wherein a first number of flaps can be moved in the circumferential direction of the vehicle wheel next to one another into the position covering the outside of the spokes at a delay from a further number of flaps and can be moved into the position releasing the spokes, overlapping one another at least partially. A centrifugal force actuator is further arranged in a cassette that comprises a ball-and-cable arrangement, a ball-and-gate arrangement or a tilting lever arrangement. A disadvantage of this vehicle wheel is the complex and elaborate construction for displacing the flaps.

The object of the invention is thus to create a wheel component for a motor vehicle and a method for operating such a wheel component, wherein the specified disadvantages are at least partially alleviated, preferably avoided.

The object is in particular solved by creating a wheel component for a motor vehicle. The wheel component has a wheel hub, a disc and a disc displacement device. An open state and a closed state are assigned to the disc, wherein the open state enables a better air flow through the wheel component, in particular releases a larger flow cross-section through the wheel component, than the closed state. The disc displacement device is equipped to displace the disc in the direction of an axis of rotation of the wheel component relative to the wheel hub between the open state and the closed state.

It is advantageously possible by means of the displaceable disc to dynamically adjust the wheel component corresponding to requirements and to obtain a high air flow for cooling the brakes, a reduction of the drag coefficient or a provision of air during a charging process of an electric charging device of the motor vehicle. Aerodynamics or cooling efficiency can thus advantageously be increased according to requirements.

In the context of the present technical teaching, the air flow is considered with reference to the air mass that flows through a cross-section surface per unit of time. A first air flow is described as better than a second air flow if the air mass of the first air flow is greater than the air mass of the second air flow. A greater air mass per cross-section surface and per unit of time thus flows through the wheel component in the open state than in the closed state.

According to a development of the invention, it is provided that the wheel component is a rim.

According to a development of the invention, it is provided that the disc is at least indirectly non-rotatably connected to the wheel hub. The disc thus advantageously has only one degree of freedom, in particular a degree of translation freedom in the direction of the axis of rotation of the wheel component, relative to the wheel hub.

According to a development of the invention, it is provided that the wheel component has an aero ring. The aero ring abuts on a rim of the wheel component in the circumferential direction, wherein the aero ring is designed flat such that it forms a ring shape starting from the rim radially, and in particular orthogonally to the axis of rotation, in the direction of the wheel hub. The aero ring also advantageously enables a reduction of air resistance in the open state, in particular by up to 60% in comparison with a wheel component without an aero ring. The aero ring advantageously does not have a negative effect on cooling of the brakes.

In a further preferred embodiment, the aero ring can be connected to the rim of the wheel component in the circumferential direction.

In a preferred embodiment, the aero ring is fixedly connected to the rim of the wheel component in the circumferential direction.

In a further preferred embodiment, the aero ring can be connected to at least one spoke of the wheel component.

In a further preferred embodiment, the aero ring is fixedly connected to at least one spoke of the wheel component.

According to a development of the invention, it is provided that the disc and the aero ring have the same material, in particular consist of the same material.

According to a development of the invention, it is provided that the disc abuts on an inner end surface of the aero ring with an outer end surface in the closed state, radially overlapping and at least partially sealing. An air flow between the disc and the aero ring is thus advantageously reduced and preferably avoided.

The object is also solved by creating a method for operating a wheel component, in particular a wheel component according to the invention or a wheel component according to one of several of the previously explained embodiments, wherein a disc is displaced in the direction of an axis of rotation relative to a wheel hub of the wheel component between an open state and a closed state depending on at least one parameter. The open state enables a better air flow through the wheel component than the closed state. The advantages in particular arise in connection with this method which have already been explained in connection with the wheel component.

The disc is preferably in the open state if the motor vehicle is parked in order to enable sufficient cooling, in particular of a brake disc and/or a battery of the motor vehicle. Alternatively or in addition, the disc is displaced into the closed state while the motor vehicle is driving to reduce the drag coefficient of the vehicle, in particular by up to 130%.

In particular, the disc can preferably be constantly displaced into any position between the open state and the closed state.

According to a development of the invention, it is provided that the at least one parameter is selected from a group consisting of a rotational speed of the wheel component, a number of activations of a brake system within a pre-determined period of time, a brake disc temperature and an input of a driver of the motor vehicle.

According to a development of the invention, it is provided that the disc is displaced into the open state or remains in the open state if the rotational speed is less than a pre-determined first limit rotational speed. The disc is additionally displaced into the closed state or remains in the closed state if the rotational speed is greater than or equal to a pre-determined second limit rotational speed.

In an embodiment of the method, the pre-determined first limit speed and the pre-determined second limit speed are identical. The disc is thus either in the open state or in the closed state.

In a preferred embodiment of the method, the pre-determined first limit rotational speed and the pre-determined second limit rotational speed are different, in particular the pre-determined first limit rotational speed is less than the pre-determined second limit rotational speed. The disc is preferably displaced into a position between the open state and the closed state if the rotational speed is greater than or equal to the pre-determined first rotational speed and less than the pre-determined second limit rotational speed. The position between the open state and the closed state is preferably selected such that the disc is spatially closer to the open state than to the closed state if the rotational speed is closer to the pre-determined first limit rotational speed. The position between the open state and the closed state is additionally preferably selected such that the disc is spatially closer to the closed state than to the open state if the rotational speed is closer to the pre-determined second limit rotational speed.

According to a development of the invention, it is provided that the disc is displaced into the open state or remains in the open state if the number of activations of the brake system within the pre-determined period of time is greater than a pre-determined first limit number of activations. The disc is additionally displaced into the closed state or remains in the closed state if the number of activations of the brake system within the pre-determined period of time is less than or equal to a pre-determined second limit number of activations.

In an embodiment of the method, the pre-determined first limit number of activations and the pre-determined second limit number of activations are identical. The disc is thus either in the open state or in the closed state.

In a preferred embodiment of the method, the pre-determined first limit number of activations and the pre-determined second limit number of activations are different, in particular the pre-determined first limit number of activations is greater than the pre-determined second limit number of activations. The disc is preferably displaced into a position between the open state and the closed state if the number of activations within the pre-determined period of time is less than or equal to the pre-determined first number of activations and greater than the pre-determined second number of activations. The position between the open state and the closed state is preferably selected such that the disc is spatially closer to the open state than to the closed state if the number of activations in the pre-determined period of time is closer to the pre-determined first limit number of activations. The position between the open state and the closed state is additionally preferably selected such that the disc is spatially closer to the closed state than to the open state if the number of activations in the pre-determined period of time is closer to the pre-determined second limit number of activations.

According to a development of the invention, it is provided that the disc is displaced into the open state or remains in the open state if the brake disc temperature is greater than a pre-determined first limit temperature. The disc is additionally displaced into the closed state or remains in the closed state if the brake disc temperature is less than or equal to a pre-determined second limit temperature.

In an embodiment of the method, the pre-determined first limit temperature and the pre-determined second limit temperature are identical. The disc is thus either in the open state or in the closed state.

In a preferred embodiment of the method, the pre-determined first limit temperature and the pre-determined second limit temperature are different, in particular the pre-determined first limit temperature is greater than the pre-determined second limit temperature. The disc is preferably displaced into a position between the open state and the closed state if the brake disc temperature is less than or equal to the pre-determined first limit temperature and greater than the pre-determined second limit temperature. The position between the open state and the closed state is preferably selected such that the disc is spatially closer to the open state than to the closed state if the brake disc temperature is closer to the pre-determined first limit temperature. The position between the open state and the closed state is additionally preferably selected such that the disc is spatially closer to the closed state than to the open state if the brake disc temperature is closer to the pre-determined second limit temperature.

The invention is explained in the following with reference to the drawings:

DETAILED DESCRIPTION OF THE DRAWINGS

Figure 1A:
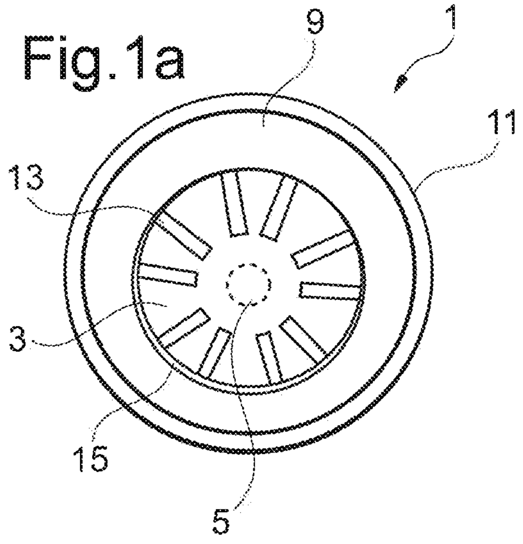
FIG. 1*a* and FIG. 1*b* show a schematic depiction of an exemplary embodiment of a wheel component in a side view wherein a disc of the wheel component is in an open state.
Figure 1B:
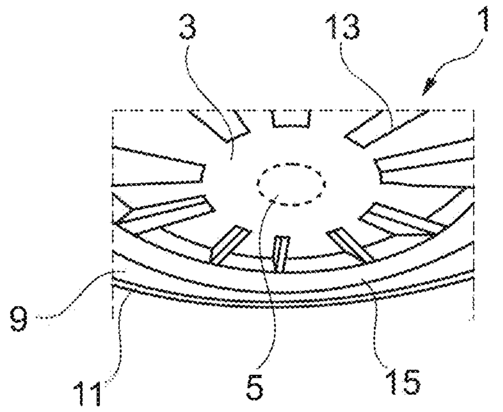
Figure 1C:
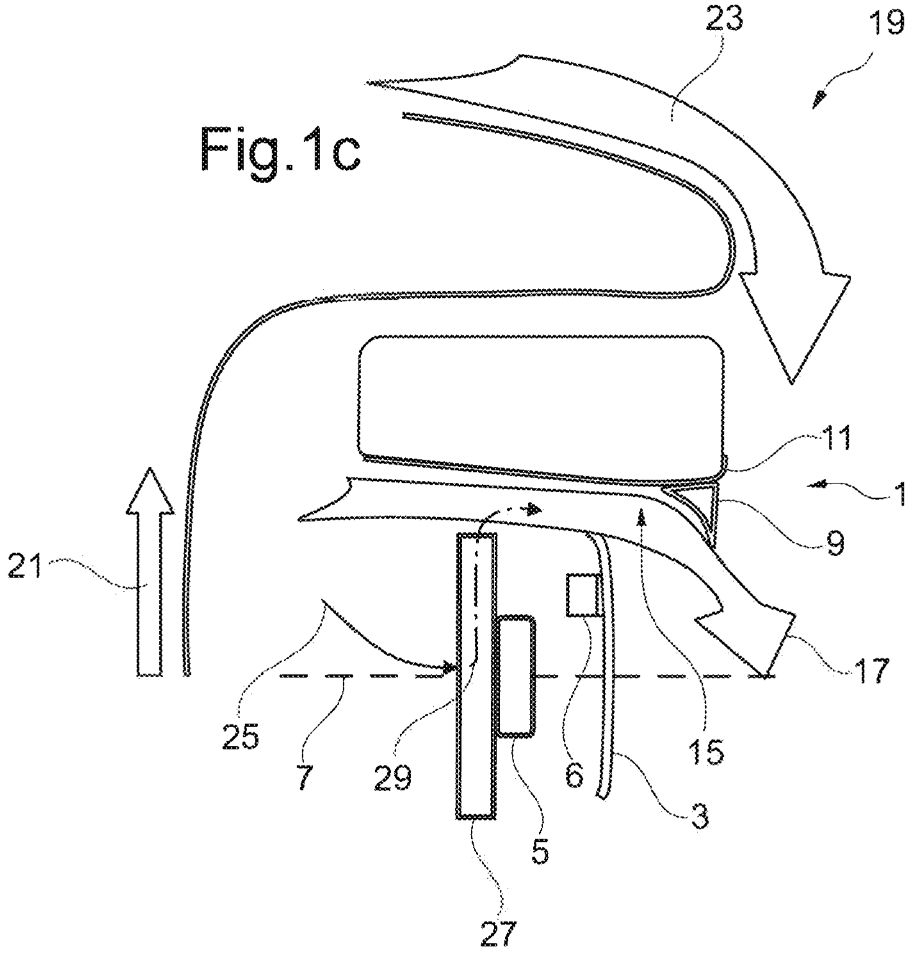
FIG. 1*c* shows a cross-section through the motor vehicle that has the wheel component.

FIGS. 1*a-c* show a schematic depiction of an exemplary embodiment of a wheel component 1, in particular a wheel, and a functionality of the wheel component 1, wherein a disc 3 of the wheel component 1 is in an open state. The wheel component 1 has a wheel hub 5, a disc 3 and a disc displacement device 6. The disc 3 has the open state and a closed state, in particular depicted in FIGS. 2*a-c*, wherein the open state enables a better air flow 17 through the wheel component 1 than the closed state. The disc displacement device 6 is further equipped to displace the disc 3 in the direction of an axis of rotation 7 of the wheel component 1 relative to the wheel hub 5 between the open state and the closed state.

The disc 3 is preferably non-rotatably connected to the wheel hub 5.

The wheel component 1 preferably has an aero ring 9, wherein the aero ring 9 abuts on a rim 11 of the wheel component 1 in the circumferential direction. The aero ring 9 is designed flat such that the aero ring 9 forms a ring shape starting from the rim 11 radially, and in particular orthogonally to the axis of rotation 7, in the direction of the wheel hub 5. The aero ring 9 is or can in particular be connected to the rim 11. Alternatively or in addition, the aero ring 9 is or can preferably be connected to at least one spoke 13 of the wheel component 1.

The disc 3 and the aero ring 9 preferably have the same material, the disc 3 and the aero ring 9 in particular consist of the same material. Alternatively or in addition, the disc 3 and the rim 11 preferably have the same material, the disc 3 and the rim 11 in particular consist of the same material. Alternatively or in addition, the disc 3 and the at least one spoke 13 preferably have the same material, the disc 3 and the at least one spoke 13 in particular consist of the same material. Alternatively or in addition, the disc 3 and the wheel hub 5 preferably have the same material, the disc 3 and the wheel hub 5 in particular consist of the same material.

FIG. 1*a* and FIG. 1*b* show the wheel component 1 in a side view in the open state. In these views, a spacing 15 between the aero ring 9 and the disc 3 can clearly be seen, which is present in the open state and enables the air flow 17 through the wheel component 1.

FIG. 1*c* shows a cross-section through the motor vehicle 19 that has the wheel component 1. The motor vehicle 19 moves in a direction of travel 21, and is thus exposed to an airstream 23. The disc 3 is in the open state, whereby the air flow 17 through the wheel component 1 is enabled. A part of the airstream 23 is directed to a brake disc 27 as cold air 25. The cold air 25 cools the brake discs 27, taking in heat in the process, and is then directed away as warm air 29 by means of the air flow 17 through the wheel component 1, in particular directed away from the motor vehicle 19.

Figure 2A:
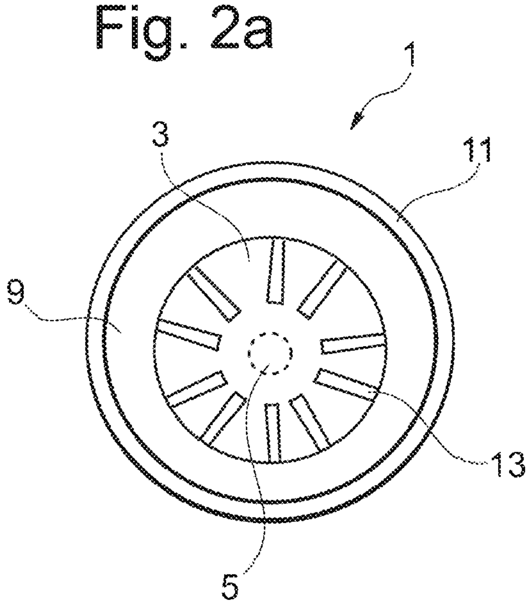
FIG. 2*a* and FIG. 2*b* show the wheel component in a side view wherein the disc is in a closed state.
Figure 2B:
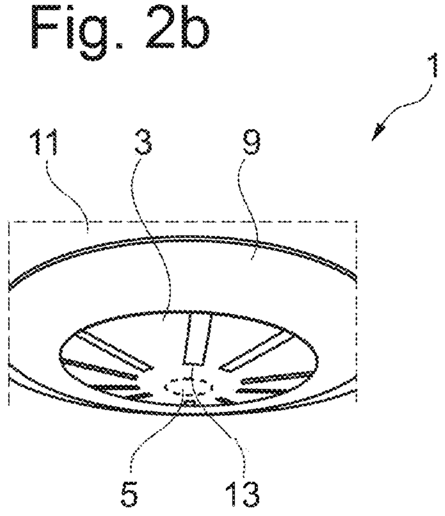
Figure 2C:
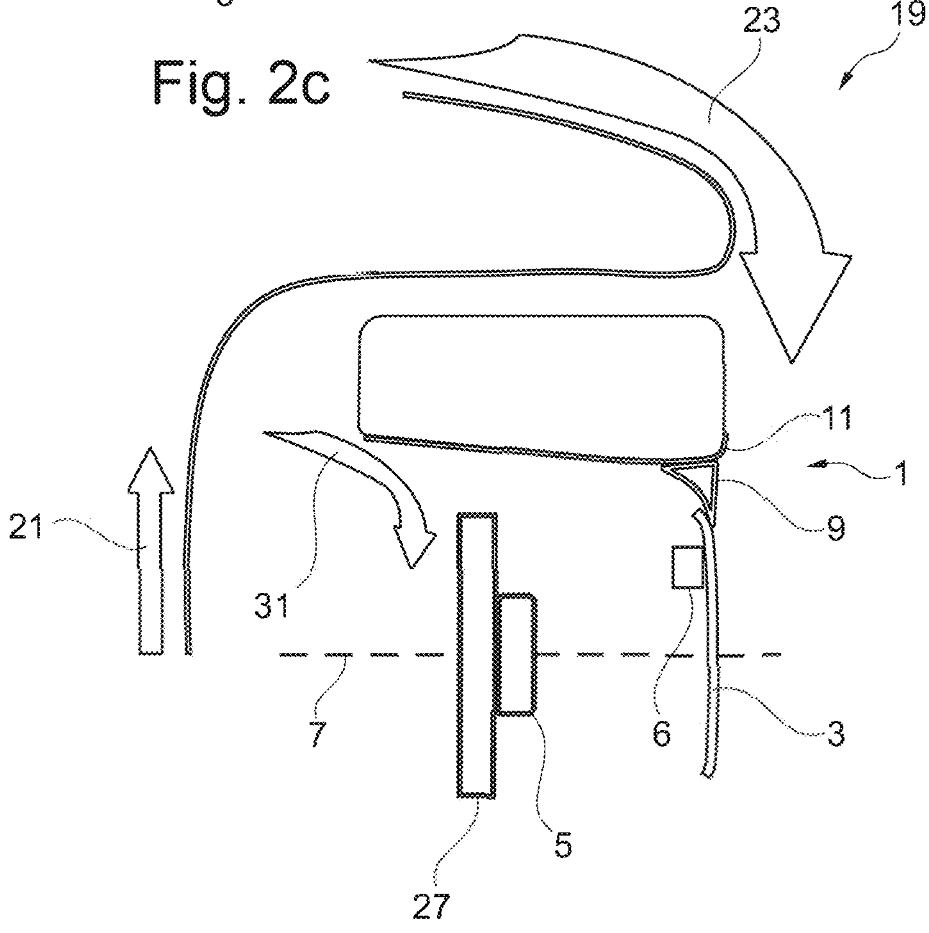
FIG. 2*c* shows a cross-section through the motor vehicle that has the wheel component.

FIGS. 2*a-c* show a schematic depiction of the exemplary embodiment of a wheel component 1, in particular a rim, and the functionality of the wheel component 1 if the disc 3 is in a closed state.

Identical elements and elements having identical functions are provided with the same reference numerals in all figures, such that reference is respectively made in this respect to the previous description.

FIG. 2*a* and FIG. 2*b* show the wheel component 1 in a side view in the closed state. In these views, it can be clearly seen that the disc 3 abuts on an inner circumferential surface of the aero ring 9 with an outer circumferential surface in a sealing manner, whereby almost no air flow 17 is enabled through the wheel component 1.

FIG. 2*c* shows a cross-section through the motor vehicle 19 that has the wheel component 1. The motor vehicle 19 moves in a direction of travel 21, and is thus exposed to the airstream 23. The disc 3 is in the closed state. In the closed state, the disc preferably abuts on the aero ring 9 in a sealing manner, whereby almost no air flow 17 is enabled through the wheel component 1. Although air circulation 31 arises behind the brake discs 27, no air can be directed away through the wheel component, and thus almost no cooling of the brake disc 27 is possible.

A comparison of FIGS. 1*a-c* with FIGS. 2*a-c* shows that a better air flow 17 through the wheel component 1 is enabled in the open state than in the closed state.

The disc 3 is displaced in the direction of the axis of rotation 7 relative to the wheel hub 5 of the wheel component 1 between the open state, in particular depicted in FIGS. 1*a-c*, and the closed state, in particular depicted in FIGS. 2*a-c*, depending on at least one parameter, wherein the open state enables a better air flow 17 through the wheel component 1 than the closed state.

The at least one parameter is preferably selected from a group consisting of a rotational speed of the wheel component 1, a number of activations of a brake system within a pre-determined period of time, a brake disc temperature and an input of a driver of the motor vehicle 19.

The disc 3 is displaced into the open state or remains in the open state if the rotational speed is less than a pre-determined first limit rotational speed. The disc 3 is further displaced into the closed state or remains in the closed state if the rotational speed is greater than or equal to a pre-determined second limit rotational speed.

Alternatively or in addition, the disc 3 is displaced into the open state or remains in the open state if the number of activations of the brake system within the pre-determined period of time is greater than a pre-determined first limit number of activations. The disc 3 is additionally displaced into the closed state or remains in the closed state if the number of activations of the brake system within the pre-determined period of time is less than or equal to a pre-determined second limit number of activations.

Alternatively or in addition, the disc 3 is preferably displaced into the open state or remains in the open state if the brake disc temperature is greater than a pre-determined first limit temperature. The disc 3 is additionally displaced into the closed state or remains in the closed state if the brake disc temperature is less than or equal to a pre-determined second limit temperature.

The invention claimed is:

1. A wheel component (1) for a motor vehicle (19), comprising:
- a rim (11);
- a wheel hub (5);
- a disc (3); and
- an aero ring (9), wherein the aero ring (9) rests on the rim (11) in a circumferential direction and forms a circular ring which extends from the rim (11) radially in a direction of the wheel hub (5);
- wherein the disc (3) is displaceable in a direction of an axis of rotation (7) of the wheel component (1) relative to the wheel hub (5) between an open state and a closed state;
- wherein the disc rests with an outer end face against an inner front surface of the aero ring (9) in a sealing manner in the closed state of the disc (3);
- wherein there is larger air flow cross-section through the wheel component (1) with the disc (3) in the open state than in the closed state.

2. The wheel component (1) according to claim 1, wherein the wheel component (1) constitutes a wheel.

3. The wheel component (1) according to claim 1, wherein the disc (3) and the aero ring (9) consist of a same material.

4. A method for operating the wheel component (1) according to claim 1, comprising the steps of:
displacing the disc (3) between the open state and the closed state depending on at least one parameter.

5. The method according to claim 4, wherein the at least one parameter is a rotational speed of the wheel component (1) and/or a number of activations of a brake system within a pre-determined period of time and/or a brake disc temperature and/or an input of a driver of the motor vehicle (19).

6. The method according to claim 4, wherein the at least one parameter is a rotational speed of the wheel component (1), wherein the disc (3) is displaced into the open state or remains in the open state when the rotational speed of the wheel component (1) is less than a pre-determined first limit rotational speed, and wherein the disc (3) is displaced into the closed state or remains in the closed state when the rotational speed of the wheel component (1) is greater than or equal to a pre-determined second limit rotational speed.

7. The method according to claim 4, wherein the at least one parameter is a number of activations of the brake system, wherein the disc (3) is displaced into the open state or remains in the open state when the number of activations of the brake system within a pre-determined period of time is greater than a pre-determined first limit number of activations, and wherein the disc (3) is displaced into the closed state or remains in the closed state when the number of activations of the brake system within the pre-determined period of time is less than or equal to a pre-determined second limit number of activations.

8. The method according to claim 4, wherein the at least one parameter is a brake disc temperature, wherein the disc (3) is displaced into the open state or remains in the open state when the brake disc temperature is greater than a pre-determined first limit temperature, and wherein the disc (3) is displaced into the closed state or remains in the closed state when the brake disc temperature is less than or equal to a pre-determined second limit temperature.

* * * * *